US010792982B2

(12) United States Patent
Lee et al.

(10) Patent No.: US 10,792,982 B2
(45) Date of Patent: Oct. 6, 2020

(54) SLIM TYPE AIR VENT FOR VEHICLE

(71) Applicants: Hyundai Motor Company, Seoul (KR); Kia Motors Corporation, Seoul (KR); Hyundai Mobis Co., Ltd., Seoul (KR); NIFCO KOREA Inc., Asan-si (KR)

(72) Inventors: Young Ju Lee, Suwon-si (KR); Jang Hyeok Ahn, Hanam-si (KR); Choong Yeul Kim, Suwon-si (KR); Young Rok Lee, Hwaseong-si (KR); Keun Sig Lim, Hwaseong-si (KR); Dae Ig Jung, Suwon-si (KR); Jae Seob Choi, Yongin-si (KR); Won Sik Kim, Suwon-si (KR); Woo Hyuk Kim, Asan-si (KR)

(73) Assignees: Hyundai Motor Company, Seoul (KR); Kia Motors Corporation, Seoul (KR); Hyundai Mobis Co., Ltd., Seoul (KR); NIFCO KOREA Inc., Asan-si (KR)

( * ) Notice: Subject to any disclaimer, the term of this patent is extended or adjusted under 35 U.S.C. 154(b) by 317 days.

(21) Appl. No.: 15/849,263

(22) Filed: Dec. 20, 2017

(65) Prior Publication Data
US 2019/0092138 A1    Mar. 28, 2019

(30) Foreign Application Priority Data
Sep. 25, 2017   (KR) .......................... 10-2017-0123128

(51) Int. Cl.
*B60H 1/34*      (2006.01)
*B60H 1/24*      (2006.01)
*F24F 13/15*     (2006.01)

(52) U.S. Cl.
CPC .......... *B60H 1/3421* (2013.01); *B60H 1/247* (2013.01); *B60H 2001/3464* (2013.01); *F24F 13/15* (2013.01)

(58) Field of Classification Search
CPC .................... B60H 1/3421; B60H 2001/3464; F24F 13/15
See application file for complete search history.

(56) References Cited

U.S. PATENT DOCUMENTS 2,920,549 A * 1/1960 Freitag .................. F24F 13/075
                                                            454/314
2,940,375 A * 6/1960 Schucker .............. F24F 13/075
                                                            454/314

(Continued)

FOREIGN PATENT DOCUMENTS

KR    10-2005-0076512 A    7/2005
KR        10-1283132 B1    7/2013

(Continued)

*Primary Examiner* — Avinash A Savani
*Assistant Examiner* — Martha M Becton
(74) *Attorney, Agent, or Firm* — Morgan, Lewis & Bockius LLP

(57) ABSTRACT

An air vent structure may include spacers mounted at sides of an outlet of an air duct; a single horizontal wing, and an upper and lower horizontal wings that have hinge grooves to which hinge pins of the spacer are inserted and formed in front side portions of the horizontal wings and positioned in horizontally in the outlet, the upper and lower horizontal wings being disposed above and below the single horizontal wing; a main link having a front end portion which a first hinge end portion hinged to a rear portion of both side surfaces of the respective horizontal wings and a rear end portion in which a second hinge end portion is formed at upper and lower portions in the rear end portion; an auxiliary wing connected to the slot of the spacer and the second hinge end portion of the main link; and a dummy wing covering the spacer.

11 Claims, 8 Drawing Sheets

(56) References Cited

U.S. PATENT DOCUMENTS

| | | | | |
|---|---|---|---|---|
| 3,456,574 A * | 7/1969 | Jakeway | | F24F 13/15 454/315 |
| 3,552,295 A * | 1/1971 | Armstrong | | B60H 1/3421 454/315 |
| 6,893,338 B2 * | 5/2005 | Katagiri | | B60H 1/3421 454/155 |
| 7,354,340 B2 * | 4/2008 | Mochizuki | | B60H 1/3421 454/152 |
| 9,878,596 B2 * | 1/2018 | Ross | | B60H 1/34 |
| 9,879,877 B2 * | 1/2018 | Takai | | F24F 13/075 |
| 9,989,275 B2 * | 6/2018 | Oe | | F24F 13/15 |
| 10,239,385 B2 * | 3/2019 | Shibata | | B60H 1/345 |
| 10,254,004 B2 * | 4/2019 | Nemoto | | F24F 13/06 |
| 10,343,492 B2 * | 7/2019 | Lin | | B60H 1/3428 |
| 10,500,927 B2 * | 12/2019 | Araujo Nieto | | B60H 1/3421 |
| 2004/0038643 A1 * | 2/2004 | Katagiri | | B60H 1/3421 454/314 |
| 2006/0073781 A1 * | 4/2006 | Mochizuki | | B60H 1/3421 454/152 |
| 2011/0207393 A1 * | 8/2011 | Kober | | B60H 1/3421 454/324 |
| 2014/0120826 A1 * | 5/2014 | Takai | | F24F 13/075 454/318 |
| 2014/0302769 A1 * | 10/2014 | Sawada | | B60H 1/3421 454/315 |
| 2015/0174989 A1 * | 6/2015 | Oe | | B60H 1/34 454/152 |
| 2016/0313025 A1 * | 10/2016 | Nemoto | | F24F 13/06 |
| 2017/0176045 A1 * | 6/2017 | Terai | | B60H 1/345 |
| 2018/0215238 A1 * | 8/2018 | Lee | | B60H 1/3421 |
| 2018/0304725 A1 * | 10/2018 | Araujo Nieto | | B60H 1/3421 |
| 2019/0092138 A1 * | 3/2019 | Lee | | B60H 1/3421 |
| 2019/0160919 A1 * | 5/2019 | Hayashima | | B60H 1/3421 |
| 2019/0193526 A1 * | 6/2019 | Stark | | B60H 1/3421 |

FOREIGN PATENT DOCUMENTS

| | | |
|---|---|---|
| KR | 10-2014-0059562 A | 5/2014 |
| KR | 10-2016-0024484 A | 3/2016 |

* cited by examiner

SLIM TYPE AIR VENT FOR VEHICLE

CROSS-REFERENCE(S) TO RELATED APPLICATIONS

The present application claims priority to Korean Patent Application No. 10-2017-0123128, filed on Sep. 25, 2017, the entire contents of which is incorporated herein for all purposes by this reference.

BACKGROUND OF THE INVENTION

Field of the Invention

The present invention relates to a slim type air vent for a vehicle. More particularly, the present invention relates to a slim type air vent for a vehicle configured for easily adjusting a vertical direction of air, and improving an appearance of the vent using a dummy wing.

Description of Related Art

In accordance with enlargement of a cluster and an audio, video, navigation (AVN) apparatus mounted in an internal of a vehicle, there is a trend that a mounting position of an air vent discharging air according to an operation of an air-conditioner and a heater is disposed to a lower area of a center fascia panel, and particularly, there is a trend that an external of the air vent is designed as a slim type.

In most cases, the air vent may include a center air vent mounted in a center fascia panel between a front side of a driver's seat and a front side of a passenger's seat, side vents mounted in crush pads of the front sides of the driver's seat and the passenger's seat, and the like.

FIG. 1 illustrates an external of the center air vent of existing air vents.

As shown in FIG. 1, a plurality of horizontal wings 11 and vertical wings 12 are angularly-rotatably mounted in an outlet of an air duct 10, an air direction adjusting knob 13 for adjusting a vertical angle of the horizontal wings 11 and a horizontal angle of the vertical wings 12 is mounted, and a damper adjusting knob 14 that may be rotated by manipulation is mounted at a position adjacent to an outlet of the air duct 10.

For reference, the damper adjusting knob 14 is configured to adjust a damper openably mounted in the air duct 10 in an air discharging direction or an air blocking direction thereof.

In such a conventional air vent, a number of horizontal wings and a number of vertical wings are at least 6, respectively, wherein the existing air vent has a structure of which a vertical width is large. Although a direction of air discharged to the internal of the vehicle may be easily adjusted toward a body of an occupant (lower side: navel, upper side: face), since a size of the air vent is large, there are problems in packaging peripheral components and various design constraints.

Furthermore, due to a structure in which the plurality of horizontal wings and vertical wings cannot but be exposed to the external, the existing air vent as described above occupies a large mounting area in the center fascia panel or crush pad, wherein a degree of freedom of design for a cluster, an AVN apparatus, and the like that are disposed around the air vent deteriorates.

Accordingly, to improve the degree of freedom of design for the cluster, the AVN apparatus, and the like, a slim type air vent in which only a single horizontal wing is externally exposed is applied.

However, in the existing slim type air vent, since a horizontal direction is longer than a vertical direction, a separate device configured for adjusting a vertical air direction is required.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing a slim type air vent for a vehicle configured for easily adjusting a vertical angle of a vertical wing for adjusting a vertical air direction using a spacer and a link, and improving an appearance by hiding the spacer and the link using a dummy wing so that the spacer and the link are not seen from an external of the vent.

Various aspects of the present invention are directed to providing a slim type air vent for a vehicle, including spacers having a front end portion on which hinge pins are formed and a rear end portion in which slots are formed, and mounted at both sides of an outlet of a slim air duct; a single horizontal wing, an upper horizontal wing, and a lower horizontal wing that have hinge grooves to which the hinge pins of the spacer are inserted and fastened formed in front side portions of both side surfaces of the horizontal wings and are disposed in a horizontal direction in the outlet of the slim air duct, the upper and lower horizontal wings being disposed above and below the single horizontal wing; a main link having a front end portion in which a first hinge end portion hinged to a rear portion of both side surfaces of the respective horizontal wings and a rear end portion in which a second hinge end portion is formed at upper and lower portions in the rear end portion; an auxiliary wing hinged to the slot of the spacer and the second hinge end portion of the main link; and a dummy wing covering the spacer and fastened to an air vent frame.

In an exemplary embodiment of the present invention, the spacer may include a fixing plate having the slots formed at upper and lower portions thereof and three or more wing connectors protruding toward an internal from the fixing plate, and the hinge pin may be integrally formed on a surface of each wing connector.

In another exemplary embodiment of the present invention, a fastening end portion fastened to the air duct frame may be formed at a rear end portion of the fixing plate.

In yet another exemplary embodiment of the present invention, the hinge pin may be formed at a front end portion of a surface of the wing connector, and positioned rearward from a front end portion of the horizontal wing to be inserted into the hinge groove of the horizontal wing.

In yet another exemplary embodiment of the present invention, a link accommodating groove corresponding to a thickness of the main link may be formed at the rear portion of each of both side surfaces of the single horizontal wing, the upper horizontal wing, and the lower horizontal wing.

In still yet another exemplary embodiment of the present invention, a link ascending and descending guide groove may be formed in an internal side surface of the spacer and a guide protrusion inserted into the link ascending and descending guide groove may be formed on an external side surface of the main link.

In a further exemplary embodiment of the present invention, guide pins inserted into the slots of the spacer may integrally protrude from both side surfaces of the auxiliary wing.

In another further exemplary embodiment of the present invention, a vertical thickness and shape of a front end portion of the dummy wing may be the same as or substantially the same as a thickness and a shape of the front end portions of the single horizontal wing, the upper horizontal wing, and the lower horizontal wing.

In yet another further exemplary embodiment of the present invention, hooks locked and fastened to the air vent frame may be integrally formed at a rear surface of the dummy wing.

In yet another further exemplary embodiment of the present invention, the upper horizontal wing and the lower horizontal wing may be covered by a crush pad or a garnish mounted on the crush pad so that only the single horizontal wing is exposed to the internal of the vehicle.

Other aspects and exemplary embodiments of the invention are discussed infra.

It is understood that the term "vehicle" or "vehicular" or other similar term as used herein is inclusive of motor vehicles in general including passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention

Figure 1:
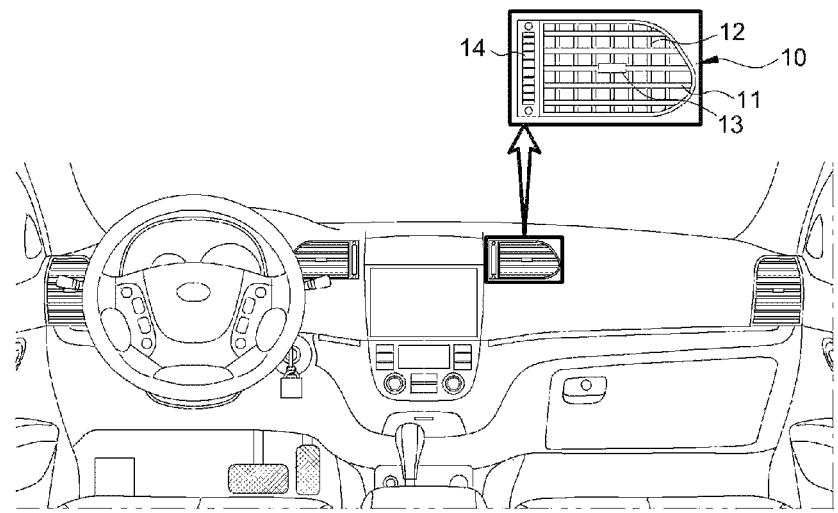
FIG. 1 is a schematic view illustrating a conventional air vent according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described more specifically with reference to the accompanying drawings.

Among directional terms used in an exemplary embodiment of the present invention, terms "front end portion", "front side", and the like signify an internal direction of a vehicle and terms "rear end portion", "rear side", and the like signify an external direction of the vehicle (engine compartment direction).

For first, to help understanding of the present invention, a meaning of the slim type air vent will be described.

Figure 2:
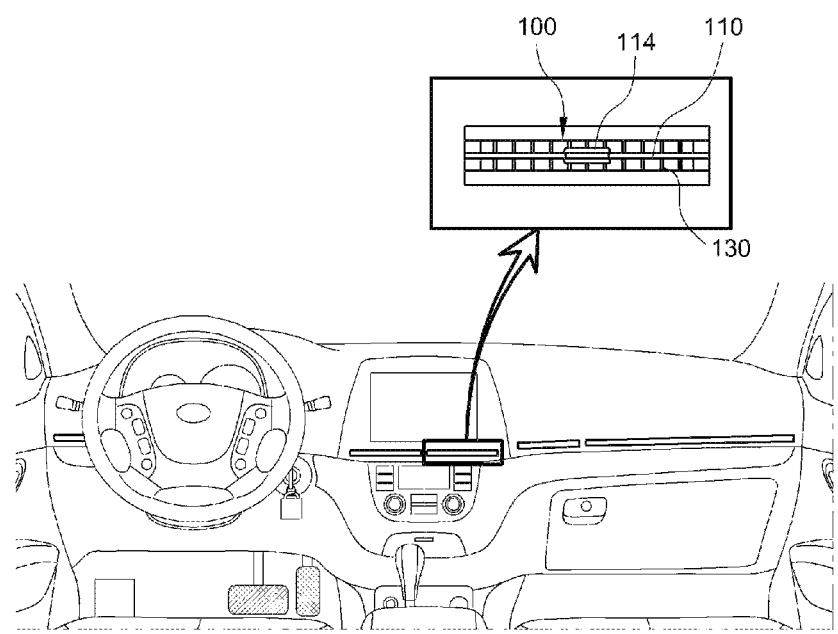
FIG. 2 is a schematic view illustrating an external of a slim type air vent according to an exemplary embodiment of the present invention.

FIG. 2 is a schematic view illustrating an external of a slim type air vent, and illustrates that only a single horizontal wing 110 is exposed to an internal of a vehicle at a position of an outlet of a slim air duct 100.

Although a plurality of vertical wings 130 are positioned to be angularly-rotatable in a horizontal direction at a rear side region of the single horizontal wing 110 to adjust a horizontal air direction, since the vertical wings are not visible from an external of the vent, thus only the single horizontal wing 110 is exposed to the internal of the vehicle.

The slim air duct 100 has a structure in which a horizontal length is relatively long and a vertical height is relatively low compared to a duct of the existing air vent, thus it is possible to secure a wider disposition region for a cluster, an audio, video, navigation (AVN) apparatus, and the like that are mounted in a center fascia panel or crush pads than the duct of the existing air vent, as well as improve a degree of freedom of design for the cluster, the AVN apparatus, and the like.

At a position of the outlet of the slim air duct 100, only the single horizontal wing 110 having a knob 114 for adjusting vertical angular rotation mounted thereon is exposed to the internal of the vehicle, expressing beauty of brevity in appearance.

However, since only the single horizontal wing 110 is exposed to the internal of the vehicle at the position of the outlet of the slim air duct 100 and mounted to be angularly-rotatable in a vertical direction, it is not easy to adjust a vertical flow direction of air discharged to the internal of the vehicle with only the single horizontal wing.

Thus, according to an exemplary embodiment of the present invention, the horizontal wing includes the single horizontal wing, and upper and lower horizontal wings disposed above and below the single horizontal wing, respectively, to be distanced from the single horizontal wing, and the respective horizontal wings are mounted in the outlet of the air vent using a spacer and a link so that vertical angles of the respective horizontal wings may be adjusted, wherein a vertical direction of the air discharged to the internal of the vehicle may be easily adjusted. Furthermore, the spacer which is a fixation support member for hinge rotation of each horizontal wing is covered by a dummy wing that looks like an extension of the horizontal wing wherein the spacer is not exposed to the internal of the vehicle, improving the appearance thereof.

Here, components of the slim type air vent for a vehicle according to an exemplary embodiment of the present invention will be referred to as below.

Figure 3:
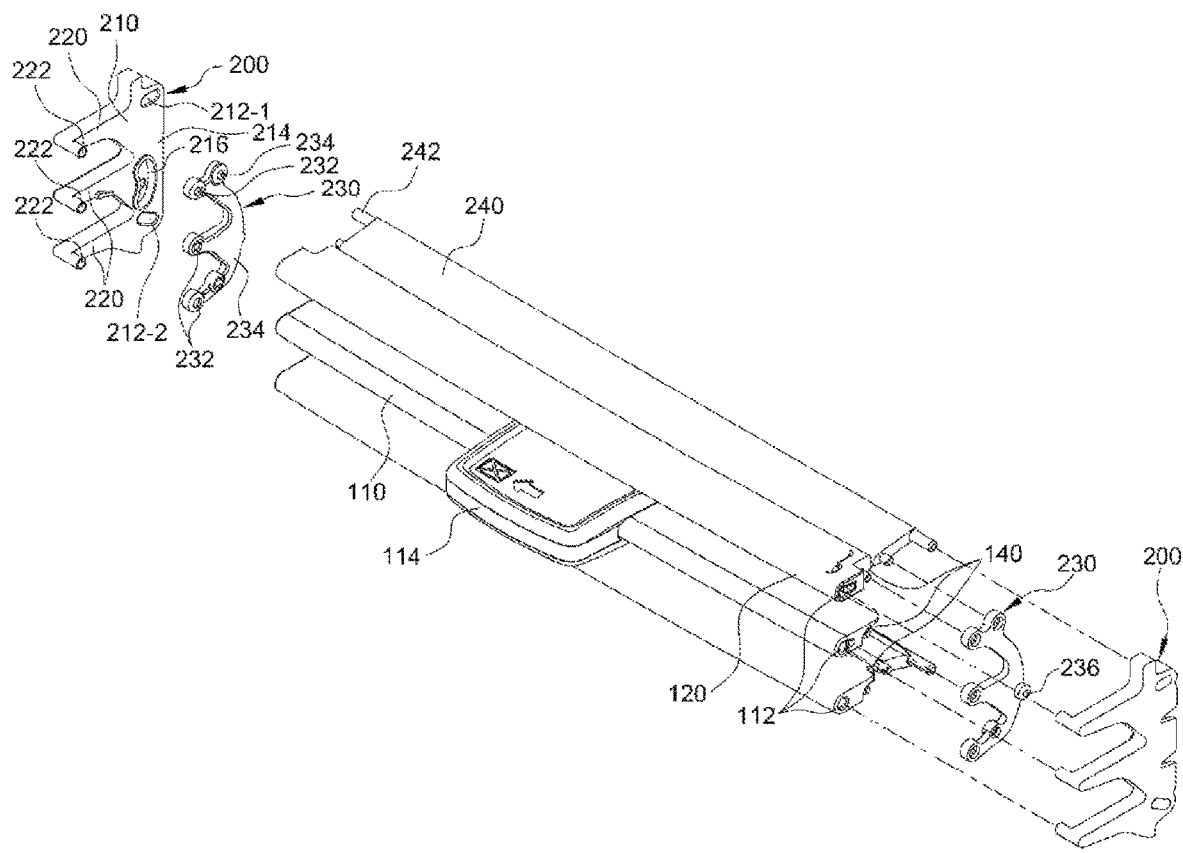
FIG. 3 is an exploded perspective view illustrating components of a slim type air vent for a vehicle according to an exemplary embodiment of the present invention.
Figure 4:
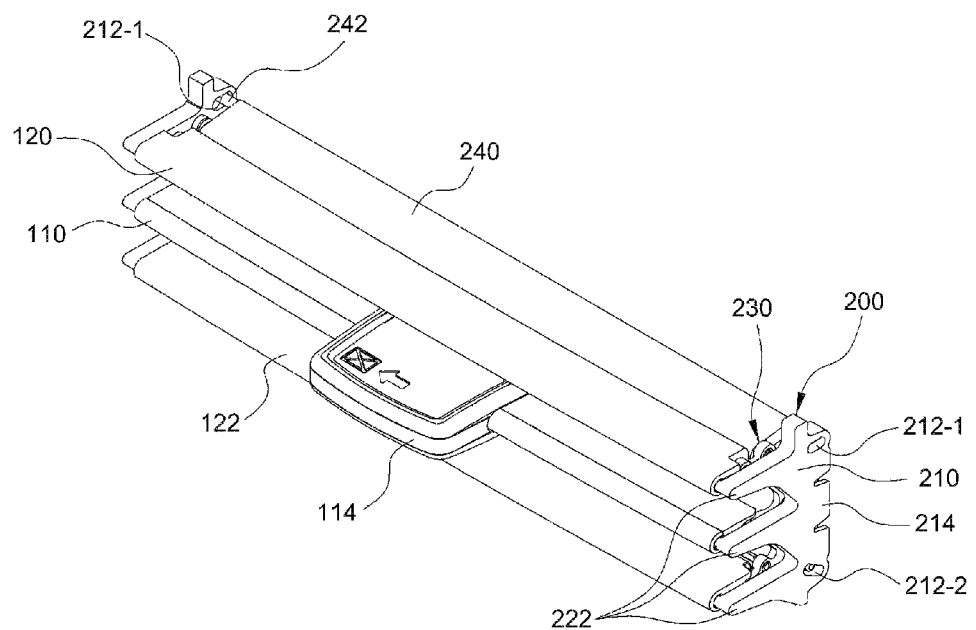
FIG. 4 is an assembled perspective view illustrating a state in which components of the slim type air vent for a vehicle according to an exemplary embodiment of the present invention are assembled.
Figure 5:
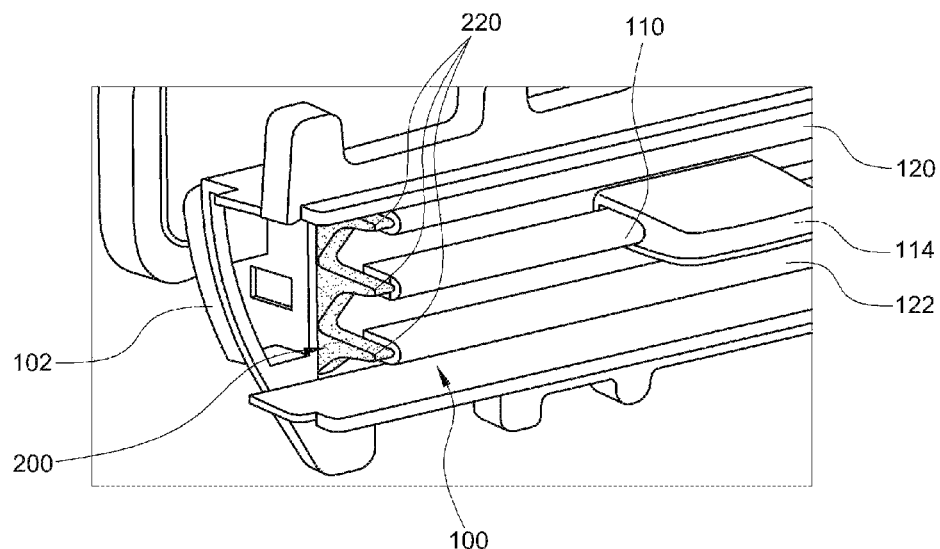
FIG. 5, FIG. 6, and FIG. 7 are perspective views illustrating states in which the slim type air vent for a vehicle according to an exemplary embodiment of the present invention is mounted in an air vent frame.
Figure 6:
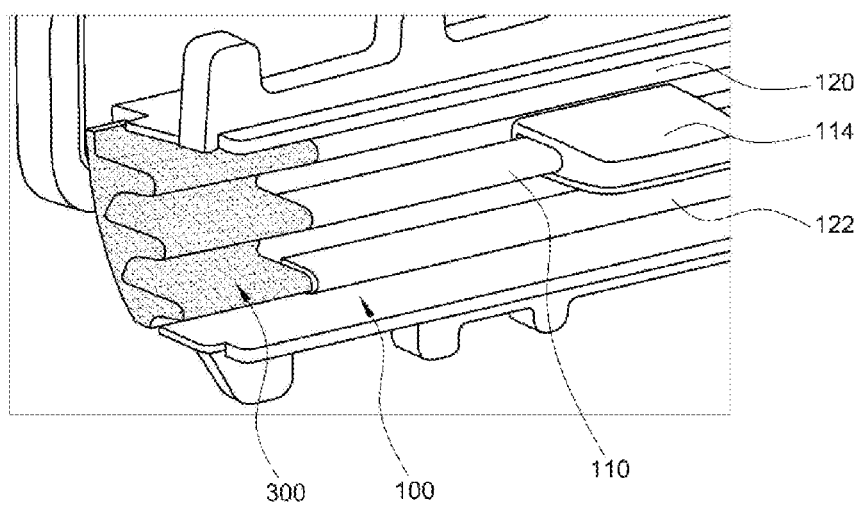
Figure 7:
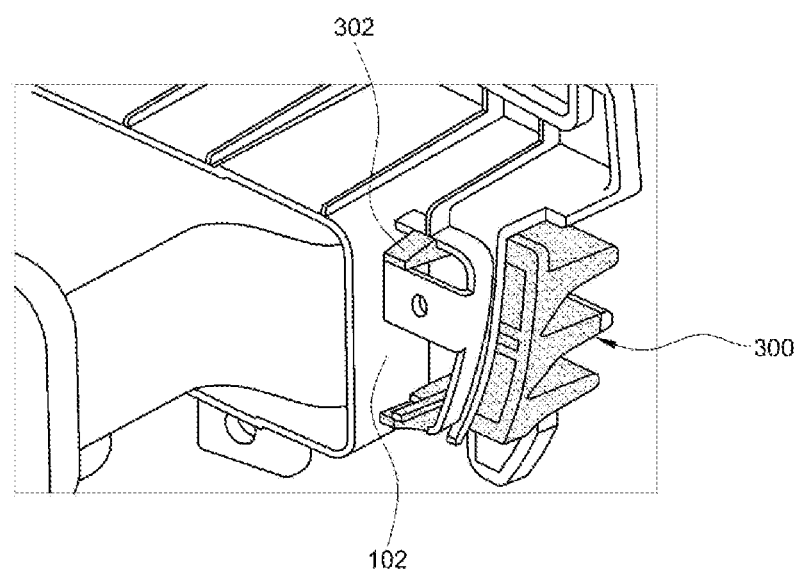

FIG. 3 and FIG. 4 illustrate the slim type air vent for a vehicle according to an exemplary embodiment of the present invention, and FIG. 5, FIG. 6, and FIG. 7 illustrate states in which the slim type air vent according to an exemplary embodiment of the present invention is assembled. In each drawing, reference numeral 200 indicates the spacer.

Referring to FIG. 3 and FIG. 4, the spacer 200 is configured as a rotation support that supports the horizontal wings to rotate in the vertical direction thereof. Hinge pins 222 are formed at one surface of a front end portion, slots 212-1 and 212-2 penetrating through upper and lower portions of a rear end portion of the spacers 200 are provided, respectively.

The spacer 200 has a structure in which a fixing plate 210 having the slots 212-1 and 212-2 formed at upper and lower end portions thereof and three or more wing connectors 220 protruding toward the internal of the vehicle from the fixing plate 210 are integrally manufactured, and is mounted at both sides of the outlet of the slim air duct 100 as illustrated in FIG. 5.

Preferably, each wing connector 220 of the spacer 200 is formed in a shape that narrows toward a front side from a rear side while having equidistant intervals in the vertical direction thereof. The reason for the above configuration is that as a thickness of a front end portion of the wing connector 220 is smaller than a vertical thickness of each of the horizontal wings 110, 120, and 122, it is possible to easily cover the wing connectors 220 by a dummy wing 300 having vertical thicknesses of front end portions corresponding to vertical thicknesses of the horizontal wings 110, 120, and 122, respectively, as described below.

The hinge pins 222 are integrally formed on one surface of each wing connector 220 of the spacer 200.

Furthermore, the slots 212-1 and 212-2 penetrate through the upper and lower end portions of the fixing plate 210 of the spacer 200. The slot of the upper portion 212-1 linearly penetrates in a forward and rearward direction, and the slot of the lower portion 212-2 is formed slanted downwardly from the front side to the rear side.

The slot 212-1 formed in the upper portion of the spacer 200 is almost horizontal in the forward and rearward direction, and the slot 212-2 formed in the lower portion of the spacer 200 is formed slanted upwards from the rear side to the front side. The reason for the above configuration is that an upward tilt angle (upward tilt angle toward the internal of the vehicle direction) of each of the wings 110, 120, and 122 is adjusted up to approximately 19° at the time of upwardly adjusting the air direction toward the internal target direction, and a downward tilt angle (downward tilt angle toward the internal direction) of each of the wings 110, 120, and 122 is adjusted up to approximately 34° at the time of downwardly adjusting the air direction thereof.

At the present time, a reason for the limitation that the upward tilt angle of each of the wings 110, 120, and 122 is adjusted up to approximately 19°, and the downward tilt angle of each of the wings 110, 120, and 1122 is adjusted up to approximately 34° is that the air duct 100 and the respective wings 110, 120, and 122 in an assembled state are already positioned and slanted at approximately 13° toward the internal of the vehicle direction thereof.

Accordingly, the upward air direction adjustment and the downward air direction adjustment by the upward and downward angle adjustment of the respective wings 110, 120, and 122 may be made in balance.

The spacers 200 having the above-described structure are mounted and fixed at positions of both sides of the outlet of the slot air duct 100, and To the present end, a fastening end portion 214 fastened to an air duct frame 102 is integrally formed at the rear end portion of the fixing plate 210 of the spacer 200.

Meanwhile, as illustrated in FIG. 5, the single horizontal wing 110 and the upper and lower horizontal wings 120 and 122 are mounted to be angularly-rotatable between the spacers 200 positioned at both end portions of the slim air duct 100, and positioned in the horizontal direction in the outlet of the slim air duct 100 while having an equidistant interval in the vertical direction thereof.

Hinge grooves 112 are formed in front side portions of both side surfaces of each horizontal wing 110, 120, and 122, and the hinge pin 222 formed on one surface of each wing connector 220 of the spacer 200 is inserted and fastened, wherein the single horizontal wing 110 and the upper and lower horizontal wings 120 and 122 are mounted to be angularly-rotatable between the spacers 200.

At the present time, a point at which the hinge pin 222 is fastened into the hinge groove 112 becomes a central point of angular rotation of each of the horizontal wings 110, 120, and 122.

The hinge pin 222 is formed at a front end portion of one surface of each wing connector 220, and the hinge groove 112 is formed at a portion distanced rearwardly from the front end portion of each of the horizontal wings 110, 120, and 122 by a predetermined distance, wherein the hinge pin 222 is positioned rearward from a front end portion of each of the horizontal wings 110, 120, and 122, and inserted and fastened to the hinge groove 112 of each of the horizontal wings 110, 120, and 122.

Thus, as illustrated in FIG. 5, there is a separation distance between the front end portion of each of the horizontal wings 110, 120, and 122 and the front end portion of each of the wing connectors 220 (where the hinge pin 222 is formed), and the separation distance is applied equally to the thicknesses of the front portion and the rear portion of the front end portion of the dummy wing 300. The reason is that, as illustrated in FIG. 6, the wing connectors 220 may be easily covered by the dummy wing 300 and at the same time, the dummy wing 300 and the horizontal wings 110, 120, and 122 may be disposed in a line along the horizontal direction thereof.

Meanwhile, a main link 230 is hinged to the rear end portion of each of both side surfaces of the horizontal wings 110, 120, and 122, and configured to allow simultaneous angular rotation of the horizontal wings 110, 120, and 122.

To this end, the main link 230 has a structure in which a first hinge end portion 232 hinged to the rear end portion of each both side surfaces of the respective horizontal wings 110, 120, and 122 is formed at a front end portion of the main link 230, and a second hinge end portion 234 is formed at upper and lower portions in a rear end portion of the main link 230.

At the present time, when the main link 230 is stacked between the respective horizontal wings 110, 120, and 122 and the spacer 200, a large clearance is generated between the horizontal wings 110, 120, and 122 and the spacer 200, and a length of the hinge pin 222 of the spacer 200 needs to be increased, that is, structural complexity may be increased.

To solve the above problem, a link accommodating groove 140 corresponding to a thickness of the main link 230 is formed at the rear end portion of each of both side surfaces of the single horizontal wing 110, the upper horizontal wing 120, and the lower horizontal wing 122.

Since the first hinge end portion 232 of the main link 230 is disposed in the link accommodating groove 140 of the respective horizontal wings 110, 120, and 122, the large clearance is not generated between the horizontal wings 110, 120, and 122 and the spacer 200, and the length of the hinge pin 222 of the spacer 200 do not need to be increased, that is, structural complexity may be resolved.

Meanwhile, an auxiliary wing 240 is hinged to the main link 230 and the slots 212-1 and 212-2 of the spacer 200, and configured to limit a range of vertical angular rotation of the respective horizontal wings 110, 120, and 122.

To the present end, the auxiliary wings 240 are positioned at the rear end portions of the upper and lower horizontal wings 120 and 122 in a form of a half-folded wing, and guide pins 242 inserted into the slots 212-1 and 212-2 of the spacer 200 integrally protrude from rear end portions of both side surfaces of the auxiliary wing 240.

Front end portions of both side surfaces of the auxiliary wing 240 are hinged to the second hinge end portions 234 of the main link 230, and the guide pins 242 formed at the rear end portion are movably inserted and fastened to the slots 212-1 and 212-2.

Accordingly, when the respective horizontal wings 110, 120, and 122 are mounted to be angularly-rotatable in the vertical direction in the outlet of the slim air duct 100 using the spacer 200, the main link 230, and the auxiliary wing 240 to adjust the vertical air direction, as illustrated in FIG. 5, the wing connector 220 of the spacer 200 is exposed to the internal of the vehicle, deteriorating the appearance of the vent.

Accordingly, as illustrated in FIG. 6 and FIG. 7, dummy wings 300 covering the spacers 200 are mounted at both the side end portions of the respective horizontal wings 110, 120, and 122.

A front end portion of the dummy wing 300 is formed to cover the spacer 200, and hooks 302 locked and fastened to the air vent frame 102 are integrally formed at a rear surface of the dummy wing 300.

A vertical thickness and shape of the front end portion of the dummy wing 300 are the same as or substantially the same as the thickness and the shape of the front end portion of the horizontal wings 110, 120, and 122, and a thicknesses (molded thickness) of a front portion and a rear portion of the front end portion of the dummy wing 300 are the same as or substantially the same as the separation distance between the front end portion of each of the horizontal wings 110, 120, and 122 and the front end portion of each of the wing connectors 220 (where the hinge pin 222 is formed).

Accordingly, the dummy wing 300 is positioned from a front side of the spacer 200, and at the same time, the hooks 302 are locked and fastened to the rear surface of the air vent fame 102, wherein the wing connectors 220 of the spacer 200 are covered by the dummy wing 300, and the dummy wing 300 and the respective horizontal wings 110, 120, and 122 are positioned in-line along the horizontal direction, improving the appearance of the vent.

Figure 8A:
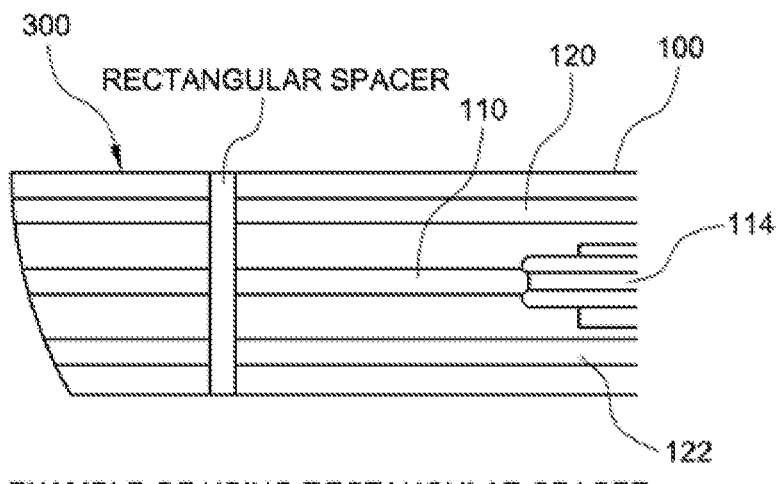
FIG. 8A and FIG. 8B illustrate a front view of the slim type air vent for a vehicle according a conventional spacer structure and an exemplary embodiment of the present invention, respectively, for comparison.
Figure 8B:
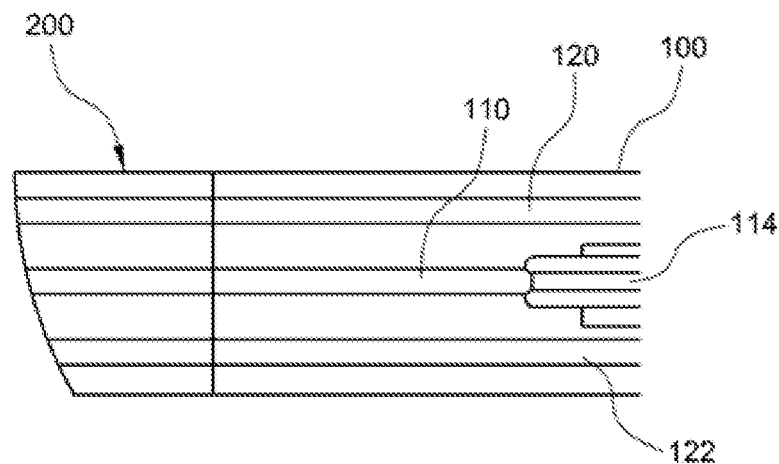

Referring to FIG. 8A, when a spacer having a simple rectangular plate shape is used, the spacer is disposed between the dummy wing 300 and the horizontal wings 110, 120, and 122 while being exposed to the internal of the vehicle, wherein disjunction between the dummy wing 300 and the horizontal wings 110, 120, and 122 occurs, that is, the appearance deteriorates. On the other hand, referring to FIG. 8B, the dummy wing 300 according to an exemplary embodiment of the present invention covers the spacer 200 so that the spacer 200 is not exposed to the internal of the vehicle, and at the same time, the dummy wing 300 is positioned with the respective horizontal wings 110, 120, and 122, in-line, improving the appearance of the vent.

Figure 9:
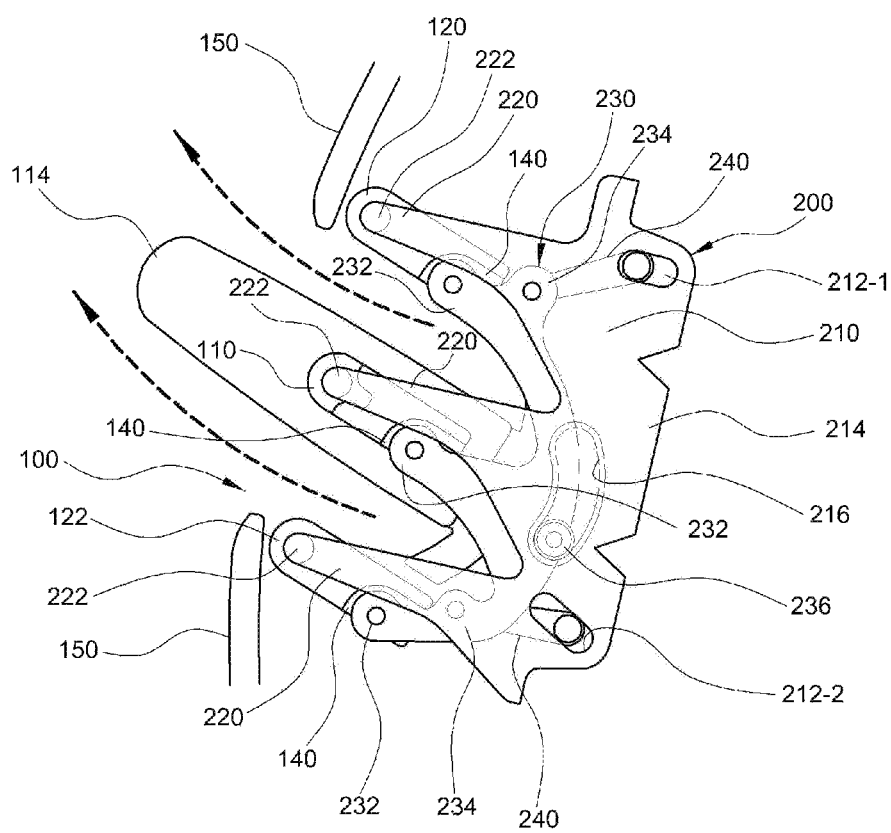
FIG. 9 and FIG. 10 are cross-sectional views illustrating states of adjusting a vertical air direction of the slim type air vent for a vehicle according to an exemplary embodiment of the present invention.
Figure 10:
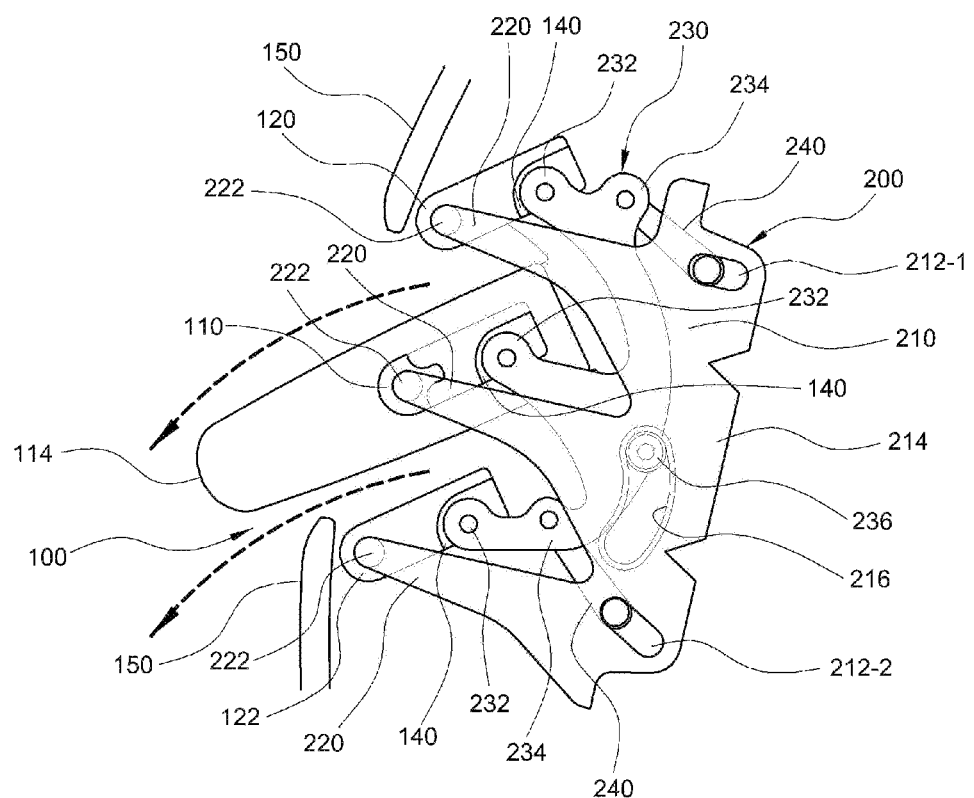

Meanwhile, referring to FIG. 9 and FIG. 10, the upper and lower horizontal wings 120 and 122 of the horizontal wings are covered by the crush pads disposed at front surfaces of a driver's seat and a passenger's seat, a garnish 150 mounted on the crush pad, or the like, and thus are not seen from the internal of the vehicle, and only the single horizontal wing 110 is exposed to the internal of the vehicle, expressing beauty of brevity of the slim type air vent wherein only one horizontal wing appears to exist.

Here, an operation flow of the slim type air vent for a vehicle according to an exemplary embodiment of the present invention including the above describe components will be referred to as below.

FIG. 9 illustrates a state in which air is discharged in an upward direction toward the internal of the vehicle, and FIG. 10 illustrates a state in which air is discharged in a downward direction toward the internal of the vehicle.

First, when a user holds and flips upwards the knob 114 disposed on the single horizontal wing 110, the rear end portion of the single horizontal wing 110 performs an angular-rotation in the downward direction based on a point at which the hinge pin 222 of the spacer 200 is inserted and fastened to the hinge groove 112, which is the central point of rotation.

At the same time, the rear end portions of the single horizontal wing 110, and the upper and lower horizontal wings 120 and 122 are all connected as a single device by the first hinge end portion 232 of the main link 230, thus when the rear end portion of the single horizontal wing 110 performs angular rotation in the downward direction, the main link 230 descends, and the rear end portions of the upper and lower horizontal wings 120 and 122 also perform angular rotation in the downward direction based on the central point of rotation.

At the present time, the front end portion of the auxiliary wing 240 also descends together as the main link 230 descends, and the guide pins 242 formed at the rear end portion of the auxiliary wing 240 move in the respective slots 212-1 and 212-2 within a predetermined range.

A link ascending and descending guide groove 216 is formed in the spacer 200, and a guide protrusion 236 inserted into the link ascending and descending guide groove 216 is formed on an external surface of the main link 230. The guide protrusion 236 of the main link 230 moves along the link ascending and descending guide groove 216 of the spacer 200 so that an ascending and descending trajectory is regular at the time of ascending and descending the main link 230.

Accordingly, when air driven by an air-conditioning apparatus is discharged to the internal of the vehicle through the outlet of the slim air duct 100, as illustrated in FIG. 9, the respective horizontal wings 110, 120, and 122 are positioned slanted upward toward the internal of the vehicle, wherein the air from the air-conditioning apparatus is discharged upwardly toward the internal of the vehicle.

On the other hand, when the user holds and flips downward the knob 114 disposed on the single horizontal wing 110, the rear end portion of the single horizontal wing 110 performs an angular-rotation in an upward direction based on the point at which the hinge pin 222 of the spacer 200 is inserted and fastened to the hinge groove 112, which is the central point of rotation.

At the same time, the rear end portions of the single horizontal wing 110, and the upper and lower horizontal wings 120 and 122 are all connected as one by the first hinge end portion 232 of the main link 230, thus when the rear end portion of the single horizontal wing 110 performs angular rotation in the upward direction, the main link 230 ascends, and the rear end portions of the upper and lower horizontal wings 120 and 122 also perform the angular rotation in the upward direction based on the central point of rotation.

At the present time, the front end portion of the auxiliary wing 240 also ascends together as the main link 230 ascends, and the guide pins 242 formed at the rear end portion of the auxiliary wing 240 move in the respective slots 212-1 and 212-2 within a predetermined range.

Accordingly, when the air driven by the air-conditioning apparatus is discharged to the internal of the vehicle through the outlet of the slim air duct 100, as illustrated in FIG. 10, the respective horizontal wings 110, 120, and 122 are positioned slanted downward toward the internal of the vehicle, wherein the air from the air-conditioning apparatus is discharged downwardly toward the internal of the vehicle.

Accordingly, the vertical direction of the air discharged to the internal of the vehicle may be easily adjusted by an operation of holding the knob 114 to perform vertical angular rotation of only the single horizontal wing 110.

Various aspects of the present invention are directed to providing the following effects.

First, the horizontal wings include the single horizontal wing and the upper and lower horizontal wings disposed above and below the single horizontal wing, respectively, to be distanced from the single horizontal wing, and the front portions of both side surfaces of each horizontal wing are connected to the hinge pins formed at the front end portion of the spacer and the rear portions of both the side surfaces of each horizontal wing are connected to the slots formed at the rear end portion of the spacer using the link, easily adjusting the vertical direction of the air discharged to the internal of the vehicle by the operation of vertical angular-rotation of only the single horizontal wing.

Second, the spacer which is a fixation support member for hinge rotation of each horizontal wing is covered by the dummy wing that looks like an extension of the horizontal wing wherein the spacer is not exposed to the internal of the vehicle, improving the appearance of the vent.

Third, the upper and lower horizontal wings that are disposed above and below the single horizontal wing to be distanced from the single horizontal wing are hidden by a crush pad, a garnish, or the like, and only the single horizontal wing is exposed to the internal of the vehicle, expressing beauty of brevity of the slim type air vent in appearance.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air vent structure for a vehicle, the air vent structure comprising:
    spacers having a front end portion on which hinge pins are formed and a rear end portion in which slots are formed, and mounted at a first side and a second side of an outlet of an air duct;
    a single horizontal wing, an upper horizontal wing, and a lower horizontal wing that have hinge grooves to which the hinge pins of the spacers are inserted and fastened in front side portions of a first side surface and a second side surface of the horizontal wings and are positioned in a horizontal direction thereof in the outlet of the air duct, the upper and lower horizontal wings being disposed above and below the single horizontal wing;
    a main link having a front end portion in which a first hinge end portion hinged to a rear portion of the first side surface and the second side surface of the respective horizontal wings and a rear end portion in which a second hinge end portion is formed at upper and lower portions in the rear end portion;
    an auxiliary wing positioned at the rear end portions of the upper and lower horizontal wings in a form of a half-folded wing, wherein guide pins inserted into the slots of the spacers integrally protrude from rear end portions of both side surfaces of the auxiliary wing, and front end portions of both side surfaces of the auxiliary wing are hinged to the second hinge end portions of the main link; and
    a dummy wing covering the spacers and fastened to an air vent frame.

2. The air vent structure of claim 1, wherein the spacers include a fixing plate having the slots formed at upper and lower end portions thereof and three or more wing connectors protruding toward an internal of the air vent structure from the fixing plate, and the hinge pins are integrally formed on a first surface of each wing connector.

3. The air vent structure of claim 2, wherein a fastening end portion fastened to the air duct frame is formed at a rear end portion of the fixing plate.

4. The air vent structure of claim 2, wherein the hinge pins are formed at a front end portion of a first surface of the each wing connector, and positioned rearward from a front end portion of the horizontal wings to be inserted into the hinge grooves of the horizontal wings.

5. The air vent structure of claim 1, wherein a link accommodating groove corresponding to a thickness of the main link is formed at the rear portion of each of the first side surface and the second side surface of the single horizontal wing, the upper horizontal wing, and the lower horizontal wing.

6. The air vent structure of claim 1, wherein a link ascending and descending guide groove is formed in an internal side surface of the spacers and a guide protrusion inserted into the link ascending and descending guide groove is formed on an external side surface of the main link.

7. The air vent structure of claim 1, wherein a vertical thickness and shape of a front end portion of the dummy wing are a same as a thickness and shape of the front end portions of the single horizontal wing, the upper horizontal wing, and the lower horizontal wing.

8. The air vent structure of claim 1, wherein hooks locked and fastened to the air vent frame are integrally formed at a rear surface of the dummy wing.

9. The air vent structure of claim 1, wherein the upper horizontal wing and the lower horizontal wing are covered by a crush pad, or a garnish mounted on the crush pad, so that only the single horizontal wing is exposed to an internal of the vehicle.

10. The air vent structure of claim 2, wherein the slot formed in an upper portion of the spacers is formed to be horizontal in a forward and rearward direction, and the slot formed in a lower portion of the spacers is formed slanted toward an internal direction thereof.

11. An air vent structure for a vehicle, the air vent structure comprising:

spacers having a front end portion on which hinge pins are formed and a rear end portion in which slots are formed, and mounted at a first side and a second side of an outlet of an air duct;

a single horizontal wing, an upper horizontal wing, and a lower horizontal wing that have hinge grooves to which the hinge pins of the spacers are inserted and fastened in front side portions of a first side surface and a second side surface of the horizontal wings and are positioned in a horizontal direction thereof in the outlet of the air duct, the upper and lower horizontal wings being disposed above and below the single horizontal wing;

a main link having a front end portion in which a first hinge end portion hinged to a rear portion of the first side surface and the second side surface of the respective horizontal wings and a rear end portion in which a second hinge end portion is formed at upper and lower portions in the rear end portion; and an auxiliary wing hinged to the slots of the spacers and the second hinge end portion of the main link, wherein a link ascending and descending guide groove is formed in the spacers, and a guide protrusion inserted into the link ascending and descending guide groove is formed on an external surface of the main link so that the guide protrusion of the main link moves along the link ascending and descending guide groove of the spacers such that an ascending and descending trajectory is regular at a time of ascending and descending the main link.

\* \* \* \* \*